US006533175B1

(12) United States Patent
Herzig et al.

(10) Patent No.: US 6,533,175 B1
(45) Date of Patent: Mar. 18, 2003

(54) AUTOMATIC COMPLIANCE-TESTING SYSTEM FOR DESKTOP DESIGNED CONSUMER PACKAGING

(75) Inventors: John Herzig, Toronto (CA); Renée Kimberly Walsh, Pickering (CA); Maria D. C. R. Furtado, Toronto (CA)

(73) Assignee: Barcode Graphic Inc., Toronto (CA)

(*) Notice: Subject to any disclaimer, the term of this patent is extended or adjusted under 35 U.S.C. 154(b) by 0 days.

(21) Appl. No.: 09/321,528

(22) Filed: May 28, 1999

(51) Int. Cl.[7] ................................................ G06K 7/10
(52) U.S. Cl. ............................ 235/462.01; 235/462.15; 235/462.16
(58) Field of Search ...................... 235/462.01, 462.07, 235/462.02, 462.12, 454, 462.15, 462.16; 714/1–3.6

(56) References Cited

U.S. PATENT DOCUMENTS

| | | | | |
|---|---|---|---|---|
| 4,459,678 A | * | 7/1984 | McCaskill et al. | 364/900 |
| 4,661,001 A | * | 4/1987 | Takai et al. | 400/103 |
| 5,051,567 A | * | 9/1991 | Tedesco | 235/462 |
| 5,142,130 A | * | 8/1992 | Sato | 235/462 |
| 5,194,720 A | * | 3/1993 | Reinnaget et al. | 235/437 |
| 5,313,373 A | * | 5/1994 | Bjorner et al. | 362/17 |
| 5,325,276 A | * | 6/1994 | Sullivan | 362/223 |
| 5,399,852 A | * | 3/1995 | Zheng et al. | 250/225 |
| 5,408,084 A | * | 4/1995 | Brandorff et al. | 235/462.42 |
| 5,481,097 A | * | 1/1996 | Tafoya | 235/462 |
| 5,548,110 A | * | 8/1996 | Storch et al. | 235/462.07 |
| 5,619,026 A | * | 4/1997 | Chou et al. | 235/462 |
| 5,703,972 A | * | 12/1997 | Lopresti et al. | 382/310 |
| 5,770,841 A | * | 6/1998 | Moed et al. | 235/375 |
| 5,818,528 A | * | 10/1998 | Roth et al. | 235/455 |
| 5,850,080 A | * | 12/1998 | Herzig | 235/494 |
| 5,914,474 A | * | 6/1999 | Spitz | 235/438 |
| 5,930,759 A | * | 7/1999 | Moore et al. | 705/2 |
| 5,982,893 A | * | 11/1999 | Hughes | 380/4 |
| 6,015,039 A | * | 1/2000 | Bonnet | 198/360 |
| 6,042,011 A | * | 3/2000 | Park et al. | 235/462.01 |
| 6,061,513 A | * | 5/2000 | Scandura | 395/701 |
| 6,062,481 A | * | 5/2000 | Storch et al. | 235/494 |
| 6,065,119 A | * | 5/2000 | Sandford, II et al. | 713/200 |
| 6,095,419 A | * | 8/2000 | Watanabe et al. | 235/462.02 |

FOREIGN PATENT DOCUMENTS

| JP | 408221428 A | * | 8/1996 |
|---|---|---|---|
| JP | 411231909 A | * | 8/1999 |

OTHER PUBLICATIONS

A.V. Aho, J.D. Ullman, The Theory of Parsing, Translation, and Compiling, vol. I: Parsing, Prentice–Hall, 1972.*

* cited by examiner

Primary Examiner—Thien M. Le
Assistant Examiner—Uyen-Chau N. Le
(74) Attorney, Agent, or Firm—Harness, Dickey & Pierce, P.L.C.

(57) ABSTRACT

An automatic compliance testing system for desktop designed consumer packaging. The automatic compliance testing system comprises an Encapsulated PostScript™ barcode file which includes an executable self-checking module which tests the barcode file for specification violations to the UPC barcode definition. The results of the self-checking operation are communicated to a checklist module. The checklist module is an executable module which generates a checklist that displays the test results. The checklist may be placed at any location, scaled, mirrored or rotated within the design document but in most cases adjacent to or outside the boundaries of the consumer packaging being designed. The automatic compliance testing system provides the capability for a PostScript™ imaging device or PostScript™ RIP software package to check compliance of the defined barcode with predetermined specifications and to indicate problems with the barcode which would result in a failed Certificate of Conformity and/or attendant non-compliance penalties.

21 Claims, 4 Drawing Sheets

FIG.9

AUTOMATIC COMPLIANCE-TESTING SYSTEM FOR DESKTOP DESIGNED CONSUMER PACKAGING

FIELD OF THE INVENTION

The present invention relates to barcoding systems and more particularly to a self-checking system for computer generated barcodes.

BACKGROUND OF THE INVENTION

The U.P.C. or Universal Product Code is very widely used in the retail and wholesale trades, usually being applied to packages or labels in the form of a printed barcode which is machine readable by suitable scanners. The barcode also incorporates the U.P.C. in human readable form along a lower margin so as to permit manual entry of the code in the event of a scanning failure. The U.P.C. in barcode form is used extensively in inventory management, and point-of-sales (POS) systems. Further details of the U.P.C. specification are found in the "U.P.C. Symbol Specification Manual" published by Uniform Code Council, Inc. (1986).

Many retailers now penalize suppliers heavily if a barcode does not scan properly. In some cases, retailers refuse to order stock from a supplier when barcode errors have occurred too many times, resulting in significant losses for the supplier. The supplier in turn may penalize a designer, film-house, plate maker, or printer for defectively printed barcodes. The extent of the problem is discussed in articles by the inventor published in the trade journal "Canadian Packaging", namely "The Get-Tough Approach" (May, 1992); "UPC Barcodes and the Desktop Revolution" (February, 1993); and "Desk-top Barcodes Revisited" (May, 1994). The generally similar EAN coding system is widely used in Europe.

Barcodes are also used to encode many other types of data where machine readability of such data from printed material is required, and accurate printing of such data is essential to readability. There are many factors that can compromise the readability of barcodes during scanning. Most involve distortions introduced during press and pre-press operations used to apply the barcode to a substrate, and substrate based problems. Additionally, the master from which the barcode is reproduced may be incorrectly used or specified, e.g. it may have been prepared for a different printing process from that actually used.

In the art, there are commercially available desktop design computer software programs, for example Adobe Illustrator™, Adobe PageMaker™, and Quark XPress™, for designing consumer packaging. Such programs are run on a computer system commonly referred to as a packaging design system. The packaging design system typically comprises a personal computer, such as a PC or Macintosh, and a PostScript™ imaging device. The packaging design system allows a designer to create a design for a consumer package and also place barcode markings on the consumer package. The elements of the barcode are defined in terms of PostScript™ commands which are contained in an Encapsulated PostScript™ (EPS) file, which is part of a document file generated by the desktop design computer software program. The PostScript™ language is an industry standard page description language which was developed by Adobe. The EPS file is outputted to a Raster Image Processor (RIP) in the PostScript™ imaging device. The RIP interprets the commands and directs the imaging device to generate the barcode defined by the designer through the commands. The imaging device produces the film separations which are used to make printing plates. In known manner, the printing plates are used to print the packages with the integrated barcode markings on the packaging.

The present invention provides a mechanism for testing barcodes generated by packaging design systems. The mechanism according to the invention permits a PostScript™ imaging device or PostScript™ RIP software package (e.g. Adobe Distiller™) to check compliance of the defined barcode with predetermined specifications and to indicate problems with the barcode which would result in a failed Certificate of Conformity and/or attendant non-compliance penalties.

SUMMARY OF THE INVENTION

The present invention provides a system for self-checking the electronic file from which a barcode is generated for possible modifications to the configuration of the barcode.

In one aspect, the present invention comprises an Encapsulated PostScript™ barcode file which includes an executable self-checking module which tests the barcode file for specification violations to the UPC barcode definition. The results of the self-checking operation are communicated to a checklist module. The checklist module is an executable module which generates a checklist that displays the test results. The checklist may be placed at any location, scaled, mirrored or rotated within the design document but in most cases adjacent to or outside the boundaries of the consumer packaging being designed.

In another aspect, the checklist may include additional information related to the barcode which is stored in the EPS file when it is created. The additional information includes Manufacturer, Date/Time created, Intended Printing Process, Product Description, Bar Color when created, Barcode Symbology, Size as Created, and Line Width Reduction specified or used. This information is also communicated to the checklist module and displayed by the checklist.

It is a feature of the present invention that the method of communicating and displaying the self-check test results is independent of the relative order of "placement" of the "checklist" and the EPS barcode file. Advantageously, this allows the desktop designer to create a packaging design and insert/delete checklists or barcodes at will.

In a first aspect, the present invention provides in a package design system having interactive input means and processing means for creating a package design bearing a barcode and an imaging output device for generating the barcode, wherein the barcode comprises a definition stored in an electronic file, a mechanism for determining compliance of the barcode definition in the electronic file, comprising: (a) means for accessing definition data in the electronic file for the barcode; (b) means for testing the definition data and producing test results; (c) means for storing the test results; and (d) means for outputting the test results.

In another aspect, the present invention provides in a package design system having interactive input means and processing means for creating a package bearing a barcode and an imaging output device for generating the barcode, wherein the barcode comprises a definition stored in an electronic file, a method for determining compliance of the barcode definition in the electronic file, the method comprising the steps of: (a) generating a definition for the barcode and storing the barcode definition in an electronic file; (b) running a check of selected parameters in the barcode definition and generating test results for checking the barcode definition before generating the barcode on the imaging output device; (c) outputting the test results to the imaging output device.

BRIEF DESCRIPTION OF THE DRAWINGS

Reference will now be made, by way of example, to the accompanying figures, which show a preferred embodiment of the present invention, and in which.

DETAILED DESCRIPTION OF THE PREFERRED EMBODIMENT

Figure 1:
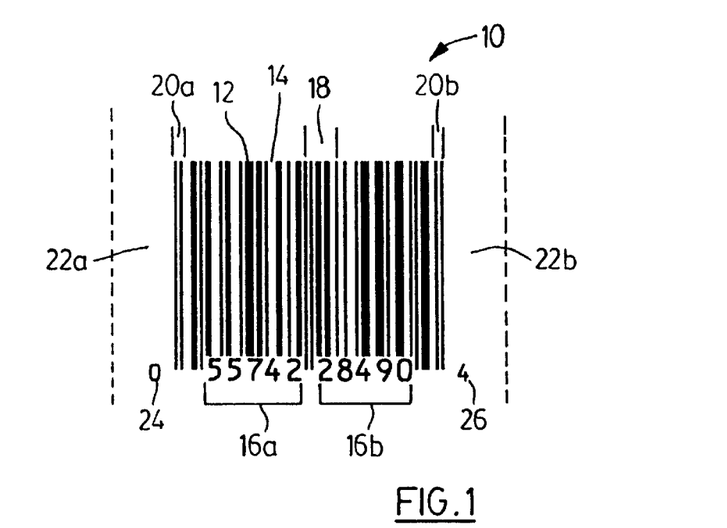
FIG. 1 shows a conventional barcode used to encode a Universal Product Code or UPC.

Reference is first made to FIG. 1 which shows a standard UPC barcode 10 according to the art. As illustrated in FIG. 1, the barcode 10 comprises a series of n parallel bars 12 of varying width which are separated by n−1 spaces indicated by reference 14. The barcode 10 also includes two groups 16a and 16b of human readable characters which are disposed to both sides of tall center guard bars 18, and located to the right of left guard bars 20a and to the left of right guard bars 20b. The guard bars 20a, 20b provide respective data start and data stop boundaries for the barcode data. The two human readable character groups 16a, 16b provide manufacturer information and product information, respectively.

As also shown in FIG. 1, the barcode 10 includes a left light margin 22a to the left of the left guard bars 20a and a right light margin 22b to the right of the right guard bars 20b. The barcode 10 also includes a numeric figure in the left margin indicated by reference numeral 24 and another numeric figure in the right margin 22b indicated by reference numeral 26. The first numeric FIG. 24 provides a human readable reference to the numbering system which is utilized for encodification in the barcode 10. The second numeric FIG. 26 provides another human readable reference which is used as a check digit for the barcode 10.

In known manner, a barcode 10 of the type shown in FIG. 1 is generated using a film/print process, or by an electronic master in which the barcode is contained in an EPS (Encapsulated PostScript™) file which is stored on suitable data storage media. In the EPS file, the barcode is defined in terms of page description commands according to the industry standard PostScript™ language developed by Adobe.

As will now be described, the present invention provides a self-checking system and mechanism for ascertaining compliance of electronic barcodes, i.e. EPS barcode files, of the type generated by a packaging design system running a desktop design computer software program according to the art. Such a packaging design system comprises a general purpose computer (i.e. a PC or a Macintosh), a desktop design computer software program, and a PostScript™ imaging device, for example a PostScript™ capable printer. The PostScript™ imaging device includes a Raster Image Processor (RIP) which interprets PostScript™ language commands and directs the imaging device to generate the defined images. The desktop design computer software program comprises a commercially available software package, such as Adobe Illustrator™, Adobe PageMaker™, or QuarkXPress™, and enables a designer to create a consumer package design and place (i.e. image) barcodes on the consumer package. The consumer package created by the designer on the packaging design system is stored in a document file which includes an Encapsulated PostScript™ or EPS file. In known manner, the desktop design computer software program places the Encapsulated PostScript™ (EPS) file comprising PostScript™ commands which define the barcode for imaging into the document file. The imaged barcodes may be printed directly by the printer on paper, or a film sheet may be created which is used to make printing plates for printing the images with the barcode on the package panel. The EPS file is outputted to the RIP which interprets the commands and directs the imaging device to generate the packaging with the barcode.

The self-checking mechanism according to the invention also provides for a directory of barcodes and checklists to allow for the management of multiple barcodes and checklists in a document as will be described in more detail below.

The self-checking mechanism according to the invention comprises two components: a self-checking module; and an automated checklist module. Each module comprises an Encapsulated PostScript™, or EPS, file. The self-checking module is contained in a barcode EPS which also includes code, i.e. PostScript™ commands, for generating the graphic elements comprising the barcode. As will be described in more detail below, the self-checking module performs a self-check of criteria which define the barcode, and the checklist module displays a checklist which shows the results of the self-checking operation. The self-checking EPS and the checklist EPS are placed in a document file for the desktop design computer software program as PostScript™ modules which are sent together with PostScript™ commands for generating the graphic elements of the entire page of the document containing the barcode to the Raster Image Processor (RIP) in the PostScript™ imaging device.

As will be familiar to those skilled in the art, an EPS document file contains certain required elements in the body of the file including a header, a screen preview, and a body. In addition to these required elements both the barcode self-checking EPS module and the checklist EPS module contain specific code elements which, when both present in the document file, permit for the self-checking of the barcode criteria and display of the results in a checklist as will now be described in more detail.

The self-checking module comprises code for performing the following operations:

(1) testing the defined barcode against predetermined criteria;

(2) creating a data dictionary which will hold results of the test;

(3) storing the test results in the dictionary;

(4) executing procedures to graphically display the results in checklist form regardless of the location, rotation or scale of the checklist.

The self-checking module also includes code for managing multiple barcodes and checklists in a single document, i.e. a consumer package design, as will be described in more detail below.

The predetermined criteria against which the barcode (as defined or modified by the designer) is tested and flagged as an error or as a caution (as indicated below) by the self-checking module include the following:

(1) overall reduction of the UPC barcode to below 80% magnification of nominal dimensions is flagged as a failure;

(2) enlargement of the UPC barcode to over 200% magnification of nominal dimensions is flagged as a failure;

(3) alteration of the barcode in terms of color used for the bars is flagged as a caution to test again;

(4) output resolution which is less than the minimum required resolution is flagged as a caution;

(5) truncation of the barcode by more than ±2 millimeters is flagged as a failure;

(6) inadequately sized quiet zones are flagged as a failure;

(7) an altered aspect ratio is flagged as a caution;

(8) truncated or clipped human readable characters are flagged as a failure;

(9) the minimum allowable cylindrical package diameter is noted for the barcode's actual size; and (10) skew checking is flagged as a caution.

As will be described in more detail below, a failure flag results in a checklist ill of the form shown in FIG. 6 being generated, while a caution flag results in a checklist 121 of the form shown in FIG. 8 being generated by the checklist module. A barcode EPS which meets or complies with the test criteria results in a checklist 100 of the form shown in FIG. 2 being generated.

Reference is now made to the accompanying pseudo code which describes the self-checking module and checklist module in further detail.

The self-checking module for the barcode EPS may be implemented as illustrated by the following pseudo code. In the pseudo code, data-structures and functions are denoted by italics.

```
1:  <EPS Header>
2:  if (RIP is Level 2 or higher) then
3:      if (no barcodes and no check-lists have yet been placed in
        the PostScript document) then
4:          <declare the shared variables in global VM (i.e.
            number of barcodes, number of checklists, number of
            checklists completed, number of barcodes waiting to
            be documented)>
5:          <define procedures in global VM called by both check-
            lists and barcodes>
6:      end if
7:      if (no other barcodes have been placed in the PostScript
        document) then
8:          <declare the barcode directory in global VM>
9:          <define procedures in global VM for logging info into
            barcode directory>
10:     end if
11:     <define variables which contain this barcode's parameters
        (i.e. size, LWR (Line Width Reduction), printing process,
        bar colors, product description, etc.); this section is
        created when the barcode is generated.>
12:     <write barcode's parameters into barcode directory>
13:     <perform sizing tests and write test results into barcode
        directory>
14: end if
15: <image the barcode>
```

-continued

```
16: if (RIP is Level 2 or higher) then
17:     <call check-list drawing procedure for all barcodes not yet
        check-listed while unused check-lists are available>
18: end if
```

Referring to the pseudo-code listing, the top portion of the self-checking module comprises the EPS header (Line 1). The first operation in the self-checking module involves checking if the Raster Image Processor (RIP) in the PostScript™ imaging device is Level 2 or higher (Line 2). (This particular implementation is only fully functional on a RIP with at least a Level 2 capability.) If the RIP is not Level 2 or higher, the self-checking operations are bypassed and the barcode is simply imaged without performing a self-check or generating a checklist according to the invention (Line 15). On the other hand, if the RIP is Level 2, then the self-checking operations are performed as described below.

The first operation in the self-checking operation involves determining if any barcodes or checklists have been already placed in the document file produced by the desktop design system for the consumer packaging design (Line 3). If no barcodes or checklists have been placed in the document file, then the shared variables are declared in global virtual memory or VM (Line 4). The shared variables include the following: number of barcodes, number of checklists, number of checklists completed and number of barcodes waiting to be documented. Next, the procedures which will be called by the self-checking module and the checklist module are defined in global virtual memory (Line 5).

If there are no barcodes that have been placed in the barcode EPS file (Line 7), i.e. this is the first barcode being placed in the document file, then a barcode directory is created (i.e. declared) in global VM (Line 8). The barcode directory provides the capability to manage multiple barcodes in the desktop consumer packaging design system, and as will be described, a checklist directory is also provided for managing corresponding multiple checklists. Accordingly, every time a barcode or checklist is encountered in the document file, a check is made if the barcode or checklist is the first entry in the respective directory. Next, the procedures for logging into the barcode directory are defined (Line 9).

Next, the variables which contain the parameters for the barcode are defined (Line 11). The barcode parameters include size, Line Width Reduction or LWR, printing process, bar colors, product description. The barcode parameters are defined when the barcode is generated. Next, the barcode parameters are entered for the barcode in the barcode directory (Line 12). The next operation in Line 13 involves performing the actual self-checking tests. The self-checking tests comprise checking the barcode specification against predetermined criteria, such as criteria (1) to (10) described above, and pseudo-code for the size test, the aspect ratio test, the skew test, the truncation test, the quiet zone test and the human readable test is provided below. The test results are written into the entry for the barcode in the barcode directory. The next step (Line 15) involves imaging the barcode. As described above, if the RIP is not Level 2 or higher, the self-checking module moves directly to this step. Upon completion of the self-checking operations, control moves to the checklist module which generates a checklist as described below.

As described above, one of the tests performed by the self-checking module is Size Check test which involves determining if the UPC barcode 10 (FIG. 1) has been scaled down to less than 80% or up to more than 200%. The Size Check test may be implemented as illustrated by the following pseudo code.

```
1:  <define a length function L(V)>
2:  <define a vector oriented in the X-axis; call it X>
3:  <transform X by the CTM; call the resultant vector XR>
4:  if (L(XR/L(X)*mag > 2.00) then
5:      tooLargeFlag = TRUE
6:      toosmallFlag = FALSE
7:  else
8:      tooLargeFlag = FALSE
9:      if (L(XR)/L(X)*mag < 0.8) then
10:         toosmallFlag = TRUE
11:     else
12:         toosmallFlag = FALSE
13:     end if
14: end if
```

Referring to the above pseudo code listing, a vector length function is defined and called L(V) (Line 1), and a non-zero length X-axis test vector is constructed and called X (Line 2). The X-axis test vector is transformed by a current transformation matrix (CTM) and the transformed vector is called XR (Line 3). Next, the vector length function L(X) is executed and the length L(XR) is calculated (Line 4). Then the ratio L(XR):L(X) is calculated, and multiplied by the original magnification of the UPC barcode 10 when created (referred to as "mag" above) (Line 4). The result of this calculation is compared to 2.0 (i.e. 200%) as shown in Line 4. The result is also compared to 0.8 (i.e. 80%) in Line 9. The comparisons performed in Line 4 and Line 9 essentially determine the actual magnification of the UPC barcode 10 is determined after adjusting for the factor introduced by the transformation matrix CTM.

The UPC Aspect Ratio test involves determining if the aspect ratio for the UPC barcode 10 (FIG. 1) has changed. The UPC Aspect Ratio test may be implemented as illustrated by the following pseudo code.

```
1:  <define a length function L(V)>
2:  <define a vector oriented in the X-axis; call it X>
3:  <transform X by the CTM; call the resultant vector XR>
4:  <define a vector oriented in the Y-axis; call it Y>
5:  <transform Y by the CTM; call the resultant vector YR>
6:  squashedFlag = FALSE
7:  tallFlag = FALSE
8:  if (L(YR) = 0) then
9:      squashedFlag = TRUE
10: else
11:     if (L(XR)/L(YR) < 1.00) then
12:         tallFlag = TRUE
13:     else
14:         if (L(XR)/L(YR) > 1.00) then
15:             squashedFlag = TRUE
16:         end if
17:     end if
18: end if
```

Referring to the pseudo code listing shown above, a vector length function is defined as L(V) (Line 1) and a non-zero length X-axis vector is constructed and called X (Line 2). The X-axis vector X is transformed by the current transformation matrix CTM and called XR (Line 3). Another non-zero length test vector oriented in the Y-axis is constructed and called Y (Line 4). The vector Y is transformed by the transformation matrix CTM and the resultant vector is called YR (Line 5). Flags "squashedFlag" and "tallFlag" are cleared (Lines 6 and 7, respectively). If the length of the Y-axis vector Y is zero (Line 8), then the flag "squashedFlag" is set to TRUE to indicate that the UPC barcode 10 has been compressed. Otherwise, the ratio of the vector lengths L(XR):L(YR) is calculated (Line 11) and compared to 1.00 (i.e. equal distortions in both axis—Lines 11 and 14).

The UPC Skew test involves determining if a UPC barcode 10 (FIG. 1) is skewed. The UPC Skew test may be implemented as illustrated by the following pseudo code.

```
1:  <define a dot-product function D(V1, V2)>
2:  <define a vector oriented in the X-axis; call it X>
3:  <transform X by CTM; call the resultant vector XR>
4:  <define a vector oriented in the Y-axis; call it Y>
5:  <transform Y by CTM; call the resultant vector YR>
6:  if (D(XR,YR) ≠ 0) then
7:      skewedFlag = TRUE
8:  else
9:      skewedFlag = FALSE
10: endif
```

Referring to the pseudo code for the UPC Skew test, a vector dot-product function is defined as D(V1, V2) (Line 1), and a non-zero length X-axis test vector is constructed and called X (Line 2). The vector X is transformed by the current transformation matrix CTM (Line 3) and the resultant vector is called XR. Then a test vector Y oriented in the Y-axis is constructed (Line 4). The test vector Y is transformed by the transformation matrix CTM (Line 5) and the resultant vector is called YR. Next the dot-product function D(V1, V2) is calculated and compared to zero (Line 6). Since the dot-product of the two perpendicular vectors XR and YR will be zero, the result of the dot-product calculation provides an indication if the transformation matrix CTM skews the axis of the UPC barcode 10 away from orthogonal.

The Truncation test involves determining if a UPC barcode 10 (FIG. 1) is truncated. The Truncation test may be implemented as illustrated by the following pseudo code.

```
1:  <test points 2 mm below top of barcode for insideness using the
    "infill" command>
2:  if (all test points are inside) then
3:      truncatedFlag = FALSE
4:  else
5:      truncatedFlag = TRUE
6:  endif
```

Referring to the above pseudo code, the Truncation test utilizes a native command, i.e. "infill", in the PostScript™ level 2 language which allows a point be tested against the current clipping path to determine if the point is "inside" the path, i.e. visible or not (Line 2). The truncation testing involves determining if any of the points across the top of the bars in the UPC barcode 10 (FIG. 1) have been "cut-down" in height by the clipping path associated with the box/mask currently in use with the barcode 10. If the points are inside (Line 2), then the bars have not been clipped and a flag "truncatedFlag" is set FALSE (Line 3). If the points are outside, then the bars have been clipped and the flag "truncatedFlag" is set TRUE (Line 5).

The Quiet Zones test involves determining if the quiet zones in the UPC barcode 10 (FIG. 1) are adequately sized. The Quiet Zones test may be implemented as illustrated by the following pseudo code.

```
1:  <test points across left side of the barcode for insideness>
2:  if (all test points are inside) then
3:      leftQzOkFlag = TRUE
4:  else
5:      leftQzOkFlag = FALSE
6:  endif
7:  <test points across the right side of the barcode for insideness>
8:  if (all test points are inside) then
9:      rightQzokFlag = TRUE
10: else
11:     rightQzokFlag = FALSE
12: endif
```

Referring to the above pseudo code, the Quiet Zones test also utilizes the "infill" command which is native to the PostScript™ level 2 language. The Quiet Zones test determines if any of the points down the sides of the UPC barcode 10 have been clipped, i.e. by the clipping path associated with the box/mask currently in use with the barcode following the execution steps shown above.

The Human Readable Codes test involves determining if the human readable codes (i.e. 16a, 16b in FIG. 1) in the UPC barcode 10 have been clipped. The Human Readable Codes test may be implemented as illustrated by the following pseudo code.

```
1:  <test points across bottom of the barcode for insideness>
2:  if (all test points are inside) then
3:      hrOkFlag = TRUE
4:  else
5:      hrOkFlag = FALSE
6:  endif
```

Referring to the above pseudo code, the Human Readable Codes test also utilizes the "infill" command from the PostScript™ level 2 language. The Human Readable Codes test determines if any of the points across the bottom of the UPC barcode 10 have been clipped, i.e. by the clipping path associated with the box/mask currently in use with the barcode following the execution steps shown above.

The specific coding of the remaining operations, declarations, and definitions in the self-checking module is within the understanding of one skilled in the art and therefore additional pseudo-code is not provided.

The checklist module for the barcode EPS may be implemented as illustrated by the following pseudo code. In the pseudo code, data-structures and functions are denoted by italics.

```
1:  <EPS Header>
2:  if (RIP is Level 2 or higher) then
3:      if (no barcodes and no checklists have yet been placed in
        the PostScript document) then
4:          <declare the shared variables in global VM (i.e.
            number of barcodes, number of checklists, number of
            checklists completed, number of barcodes waiting to
            be documented, etc.)>
5:          <define procedures in global VM called by both
            checklists and barcodes>
6:      end if
7:      if (no other checklists have been placed in the PostScript
        document) then
8:          <declare the checklist directory in global VM>
9:          <define procedures in global VM for logging info into
            checklist directory>
10:         <define checklist drawing procedure>
11:     end if
12:     <create a new entry in the checklist directory>
13:     <log checklist's location into the new checklist directory
        entry>
14:     <call checklist drawing procedure for all barcodes not yet
        check-listed while unused checklists are available>
15: else
16:     <generate only a rudimentary checklist graphics and inform
        user that Level 2 is needed for self-check to function
        properly>
17: end if
```

Referring to the pseudo-code listing for the checklist module, the first portion of the module comprises an EPS header (Line 1). The first operation involves checking if the Raster Image Processor (RIP) in PostScript™ imaging device is Level 2 or higher (Line 2). If the RIP is not Level 2 or higher, the check-listing operations are bypassed and only a rudimentary checklist graphic is generated, e.g. a checklist with outline and title bar only (Line 16) and the procedure is terminated. If the RIP is Level 2 (Line 2), then the checklist is generated as follows.

The checklist module determines if any barcodes or checklists have been already placed in the document file (Line 3). If no barcodes or checklists have already been placed in the document file for the desktop designed consumer packaging, then the shared variables are declared in global virtual memory or VM (Line 4). The shared variables include the following variables: number of barcodes, number of checklists, number of checklists completed and number of barcodes waiting to be documented. Next, the procedures which will be called by both the checklist module and the self-checking module are defined in global virtual memory (Line 5).

If there no other checklists that have been placed in the document file from the desktop consumer packaging design system (Line 7), i.e. this is the first checklist which is being placed, then a checklist directory is declared in global VM (Line 8). The checklist directory provides the capability to manage multiple checklists in document file or files. The procedures for logging or entering information into the checklist directory are defined (Line 9). Next, a checklist drawing procedure or function is defined (Line 10). Next, a new entry is created for the checklist in the checklist directory (Line 12), and the checklist's location is logged with the new entry in the checklist directory (Line 13). Next, a checklist drawing procedure or function is called (Line 14). If the RIP is Level 2 or higher (Line 16), a procedure for drawing the checklist is called (Line 17). The checklist drawing procedure is coded to produce a compliant checklist 100 of the form shown in FIG. 2, a non-compliant checklist 111 of the form shown in FIG. 6, and a cautionary checklist 121 as shown in FIG. 8.

The specific coding of the operations, declarations, and definitions in the checklist module is within the understanding of one skilled in the art and therefore additional pseudo-code is not provided.

Reference is next made to FIGS. 1 to 9, which show exemplary barcodes and checklists generated according to the present invention. Applying the self-check test to the barcode 10 shown in FIG. 1 results in the generation of the checklist 100 shown in FIG. 2. As shown, the checklist 100 includes a header 101, a self-check test result column 102, and an information 103 column. The self-check test column 102 includes fields 104 for the self-check criteria described above and comprises a field 104a for "Magnification", a field 104b for "Skew", a field 104c for "H/W Ratio", a field 104d for "Quiet Zones", a field 104e for "Bar Heights", a field 104f for "HR Digits", a field 104g for "Bar Color Altered", a field 104h for "RIP Output Resolution", and a field 104i for "Min Pkg Diam (picket)". The information column 103 comprises a series of fields 105 for providing additional information and includes a field 105a for "Barcode Number", a field 105b for "Regd Manufacturer Name", a first field 105c for "Product Desc 1", a second field 105d for "Product Desc 2", and the other fields 105e to 105i as shown.

Figure 2:
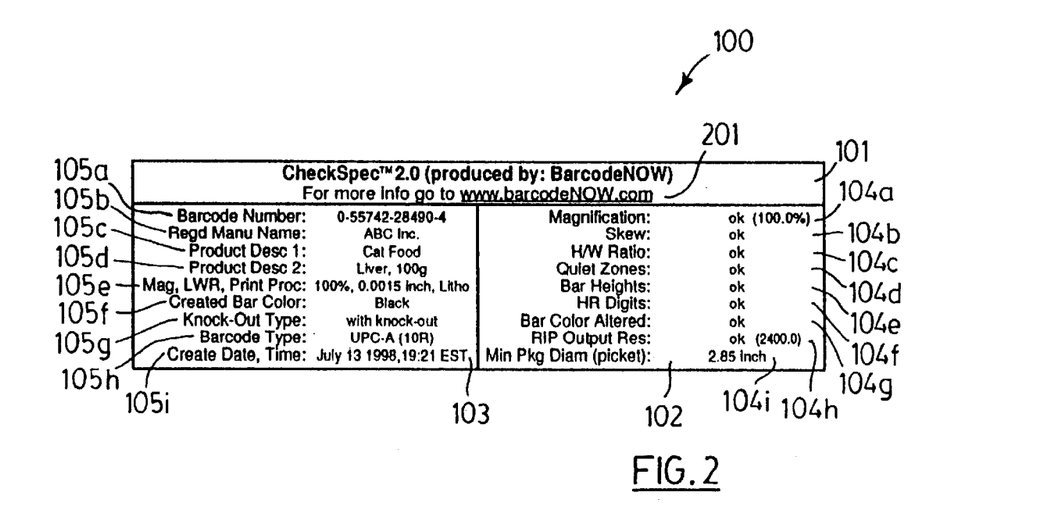
FIG. 2 shows a checklist generated by a self-checking system according to the present invention.

As also shown in FIG. 2, the checklist 100 includes a URL (Uniform Resource Locator) link or hypertext field 201 in the header 101. Once passed through Adobe Distiller™, clicking the URL link 201 launches a Web browser and takes the user to a homepage on the World Wide Web (i.e. the Internet) for the company.

Figure 3:
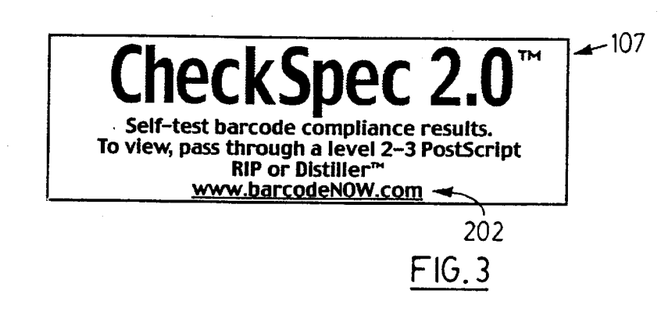
FIG. 3 shows a screen display which appears when a checklist is placed according to the present invention.

When a checklist is first placed in a document, a notice 107 of the form shown in FIG. 3 is displayed on the screen (i.e. display monitor) for the packaging design system. The notice 107 informs the designer that the self-checking results can be viewed by the passing the document file through Level 2 (or 3) PostScript™ RIP or the Adobe Distiller™. As shown in FIG. 3, the notice 107 also includes a URL (Uniform Resource Locator) link 202.

Figure 5:
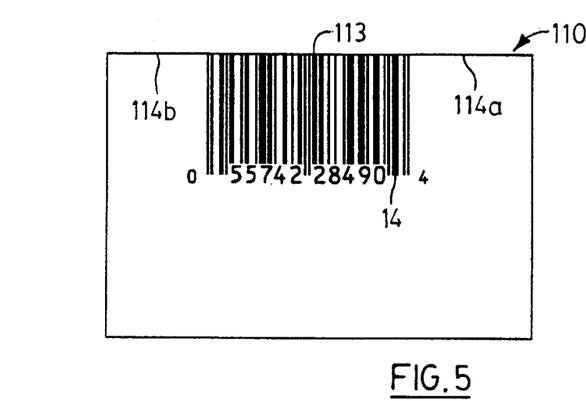
FIG. 5 shows an example of a non-compliant barcode.
Figure 6:
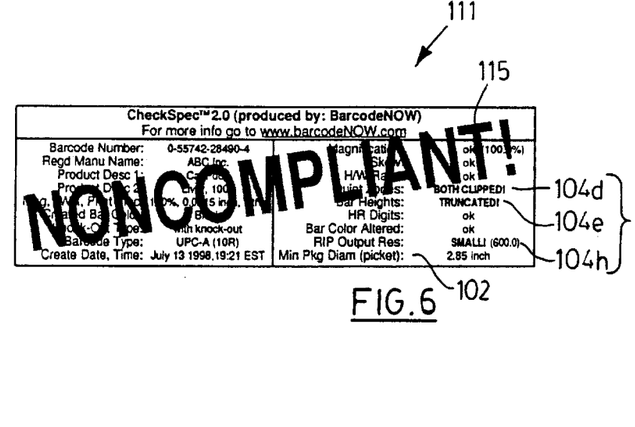
FIG. 6 shows the checklist generated by the self-checking system according to the invention for the non-compliant barcode of FIG. 5.

Reference is next made to FIGS. 5 and 6. The barcode 110 shown in FIG. 5 is defective with the height of the UPC barcode (i.e. bars 14) being truncated as indicated by reference 113 and both the left 114a and right 114b quiet zones being clipped. As a result, the barcode 110 will fail the self-check test and a checklist 111 of the form shown in FIG. 6 is generated. The checklist 111 includes a prominent "NONCOMPLIANT!" overlay 115 to indicate that the barcode 110 has failed. To clearly indicate the defective nature of the barcode 110, the "NONCOMPLIANT" overlay 115 is printed across the checklist 110 as shown. Preferably, the overlay 115 comprises a tinted overlay so that the fields 104, 105 are still visible below the overlay 115. In the self-checking results column 102, the "Quiet Zones" field 104d and the "Bar Heights" field 104e display the respective nature of the failures in boldface, while the remaining fields 104 display test results which are acceptable or "ok". As also shown in FIG. 6, the RIP Output Res (i.e. resolution) 104h is flagged as being "SMALL! (600.0)" in boldface because the samples were generated on a low resolution printer.

Figure 7:
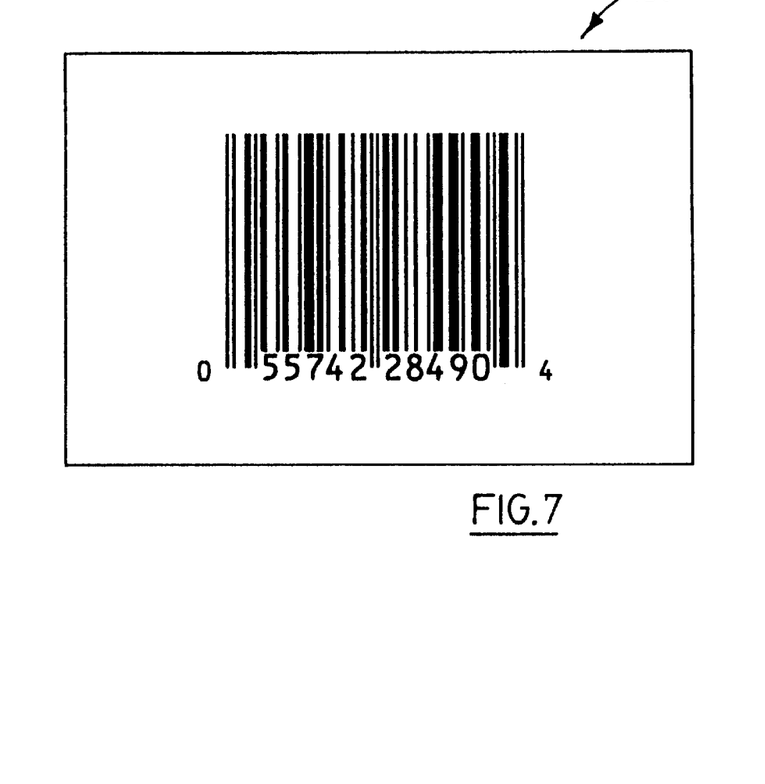
FIG. 7 shows an example of a marginally compliant barcode (i.e. imaged at too low a resolution)
Figure 8:
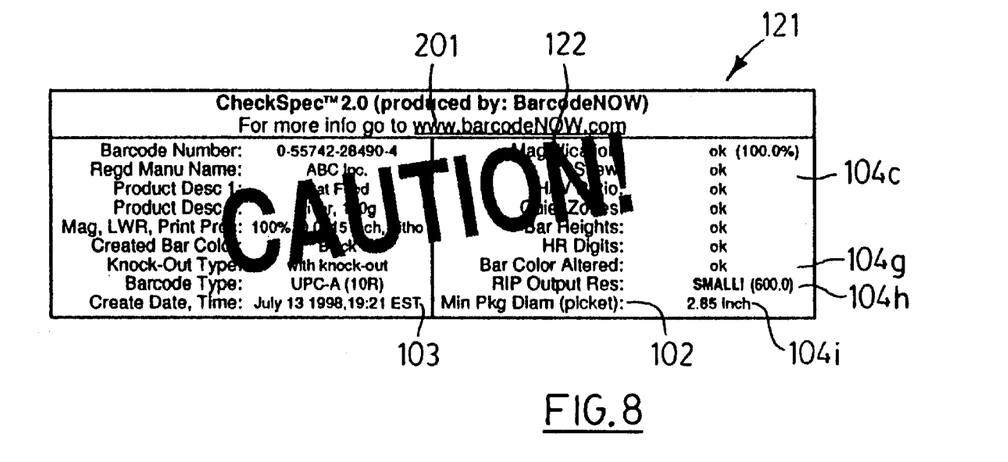
FIG. 8 shows the checklist generated by the self-checking system for the barcode of FIG. 7.

Reference is next made to FIG. 7 which shows a marginal barcode 120, and FIG. 8 which shows a checklist 121 for the marginal barcode 120. The barcode 120 shown in FIG. 7 is marginal because the output resolution is low, i.e. the designer has set the output resolution below 600 dpi. Otherwise, the barcode 120 is compliant. As a result of the low output resolution setting, the barcode 120 is flagged with a caution when the self-check test is run and the checklist 121 shown in FIG. 8 is generated. The checklist 121 includes a "CAUTION!" overlay 122 to indicate that the barcode 110 has been flagged with certain defects. Preferably, the "CAUTION!" overlay 115 is printed as a tinted overlay. The low output resolution setting is noted in the "RIP Output Res" field 104h which also includes the annotation "SMALL!" in boldface. The parameters in the remaining fields 104 display an acceptable value for the parameter in question, or the parameters 104 are specified as being "ok" indicating that the parameter in question is acceptable, for example., the H/W Ratio in field 104c and the Bar Color Altered 104g.

Figure 9:
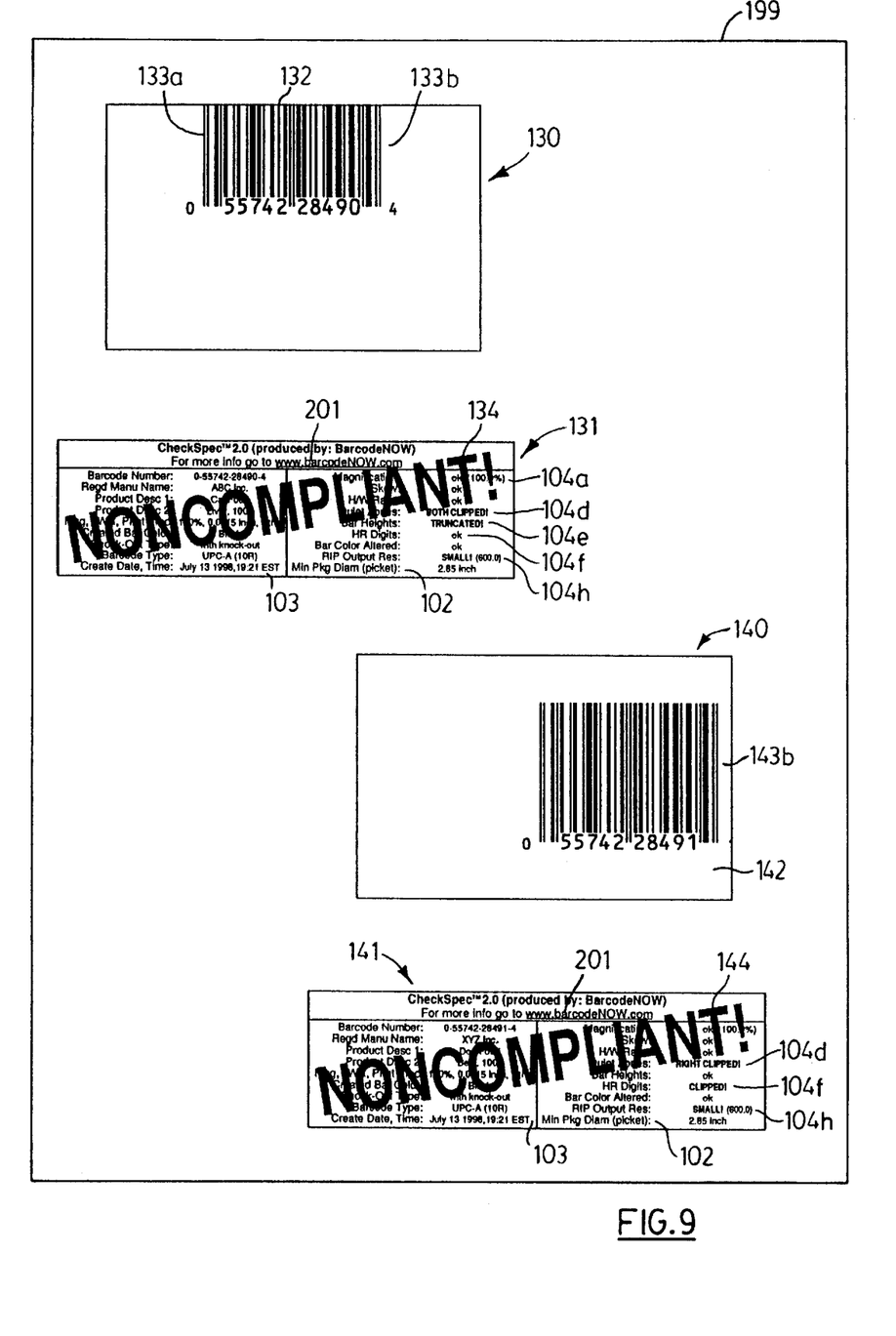
FIG. 9 shows an example of a consumer package design document in which two different and non-compliant barcodes and their associated checklists have been placed on the same page in the document.

Reference is next made to FIG. 9 which shows an example of a document (denoted by 199) in which two barcodes 130 and 140 have been placed. Each of the barcodes 130, 140 are defective and result in respective checklists 131 and 141 being generated as also shown in FIG. 9. The first barcode 130 is defective because the height of the UPC barcode (i.e. bars 14) is truncated as indicated by reference 132 and both the left 133a and right 133b quiet zones are clipped. As a result, the barcode 130 will fail the self-check test and the checklist 131 is generated. The checklist 131 includes a prominent "NONCOMPLIANT!" overlay 134 to indicate that the barcode 130 has failed the self-check test. To clearly indicate the defective nature of the barcode 110, the "NONCOMPLIANT!" overlay 134 is preferably printed as a tinted overlay across the checklist 131 as shown. In the self-checking results column 102, the "Quiet Zones" field 104d shows "BOTH CLIPPED!" in boldface indicating that both right and left quiet zones are clipped, and the "Bar Heights" field 104e shows "TRUNCATED!" in boldface to indicate that the height of the barcode is truncated. In addition, the RIP Output Res field 104h is flagged as being "SMALL!" in boldface. The parameters in the remaining fields 104 display an acceptable value for the parameter in question (e g. Magnification in field 104a) or the term "ok" indicating that the parameter in question is acceptable (e.g. the HR Digits are "ok" in field 104f)

Referring still to FIG. 9, the second barcode 140 is defective with a clipped right human readable digit 142 and a clipped right quiet zone 143b. As a result, the barcode 140 will fail the self-check test and the checklist 141 shown in FIG. 9 is generated. The checklist 141 includes a prominent "NONCOMPLIANT!" overlay 144 to indicate that the barcode 140 has failed. Preferably, the "NONCOMPLIANT!" overlay 144 is printed as a tinted overlay across the checklist 142 so that the fields 104, 105 are still visible. In the self-check test result column 102, the "Quiet Zones" field 104d and the "HR Digits" field 104f display the nature of the failure as shown in FIG. 9. In addition, the RIP Output Res field 104h is flagged as being "SMALL!" in boldface.

Figure 4:
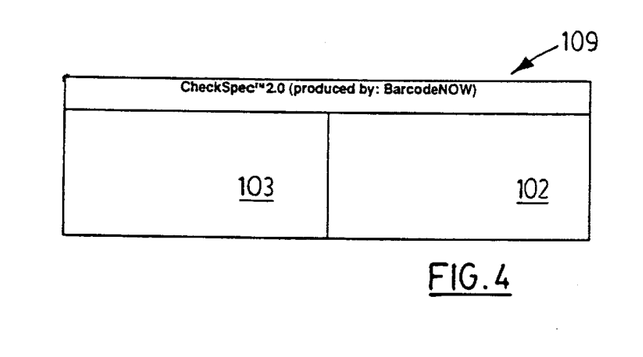
FIG. 4 shows the checklist which is displayed when a checklist is placed and a UPC barcode is not available for that checklist.

Reference is next made back to FIG. 4. If more checklists are placed than there are barcodes in the document file, then a checklist 109 of the form shown in FIG. 4 will be generated when the self-checking procedure is run. As shown in FIG. 4, the checklist 109 is blank, i.e. the self-test result column 102 and the information column 103 are empty, because there is no barcode associated with the checklist 109. The checklist 109 is displayed to inform the user, i.e. designer, the checklist is in excess of the number of barcodes, i.e. the checklist placed in the document file is surplus.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. In a packaging design system having interactive input means and processing means for creating a package bearing a barcode image, the barcode image being generated from data stored in an electronic file, the system including an imaging output module for generating an image of the package from the data in the electronic file, the image of the package including an image of the barcode, and a mechanism for determining compliance of the barcode image, comprising:

(a) means for accessing the data stored in the file;

(b) means for testing the data for generating the barcode image and producing test results;

(c) means for storing said test results; and (d) means for outputting said test results.

2. The mechanism as claimed in claim 1, wherein said means for outputting the test results comprises means for generating a graphic display indicating whether the barcode as defined in the electronic file is compliant.

3. The mechanism as claimed in claim 2, wherein said graphic display comprises a checklist having a field indicating whether the barcode is non-compliant, and plurality of barcode parameter fields listing criteria subjected to testing.

4. The mechanism as claimed in claim 3, further include a directory for managing a plurality of barcodes and a directory for managing a plurality of checklists for said barcodes.

5. The mechanism as claimed in claim 3, wherein said checklist further includes a plurality of information fields for displaying additional data related to the barcode.

6. The mechanism as claimed in claim 3, wherein said checklist further includes a field for providing a hypertext link.

7. The mechanism as claimed in claim 1, wherein said means for testing includes means for determining if an overall reduction factor meets a predetermined overall reduction factor value and means for generating a failed test result if said overall reduction factor is less than a minimum value for said predetermined overall reduction factor value.

8. The mechanism as claimed in claim 1, wherein said means for testing includes means for determining if the definition for a scaling factor meets a predetermined scaling factor value and means for generating a failed test result if said defined enlargement factor is greater than a maximum value for said predetermined enlargement factor value.

9. The mechanism as claimed in claim 1, wherein said means for testing includes means for determining if the definition for an aspect ratio has been altered and means for generating a cautionary test result if the definition for aspect ratio has been altered.

10. The mechanism as claimed in claim 1, wherein said means for testing includes means for determining if the definition of bar colors has been altered and means for generating a cautionary test result if the definition of bar colors has been altered.

11. The mechanism as claimed in claim 1, wherein said means for testing includes means for determining if the definition for output resolution meets a predetermined resolution value and means for generating a cautionary test result if the defined output resolution does not comply with the predetermined resolution value.

12. The mechanism as claimed in claim 1, wherein said means for testing includes means for determining if the definition for truncation exceeds a predetermined truncation value and means for generating a failed test result if the defined truncation does not comply with the predetermined truncation value.

13. The mechanism as claimed in claim 1, wherein said means for testing includes means for determining if the definition for quiet zones meets a predetermined size value and means for generating a failed test result if the defined quiet zones do not comply with the predetermined quiet zone size.

14. The mechanism as claimed in claim 1, wherein said means for testing includes means for determining a minimum package diameter size based on the actual barcode size.

15. The mechanism as claimed in claim 1, wherein said means for testing includes means for determining if the definition for the barcode horizontal and vertical axis are skewed from orthogonal and means for generating a cautionary test result if the barcode axis are skewed from orthogonal.

16. The mechanism as claimed in claim 15, further including a checklist directory and means for managing multiple checklists in said checklist directory.

17. The mechanism as claimed in claim 1, further including a barcode directory and means for managing multiple barcodes in said barcode directory.

18. The mechanism as claimed in claim 1, wherein said means for testing includes means for determining if the definition for one or more human readable fields meets a predetermined criterion and means for generating a failed test result if the defined human readable fields do not comply with the predetermined criterion.

19. In a packaging design system having interactive input means and processing means for creating a package bearing a barcode image, the barcode image being generated from data stored in the electronic file, the system including an imaging output module for generating an image of the package from the data in the electronic file, the image of the package including an image of the barcode, a method for determining compliance of the barcode image, said method comprising:

(a) generating data for a barcode image and storing the data in an electronic file;

(b) running a check of selected parameters in the data and generating test results for checking of the data before generating the barcode image on the imaging output device;

(c) outputting said test results to the imaging output device.

20. The method as claimed in claim 19, wherein said step of outputting the test results comprises generating a checklist listing the selected parameters and the test result for each of said selected parameters.

21. The method as claimed in claim 20, wherein said of outputting the test results further includes the step of generating a prominent notification on the checklist list if a test result has failed.

* * * * *